United States Patent
Ge (10) Patent No.: US 9,593,632 B2
(45) Date of Patent: Mar. 14, 2017

(54) SYSTEM AND METHOD FOR OPERATING AN EXHAUST GAS RECIRCULATION VALVE

(71) Applicant: Caterpillar Inc., Peoria, IL (US)

(72) Inventor: Xinyu Ge, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 14/640,049

(22) Filed: Mar. 6, 2015

(65) Prior Publication Data

US 2016/0258368 A1 Sep. 8, 2016

(51) Int. Cl.
*F02D 41/14* (2006.01)
*F02D 41/00* (2006.01)

(52) U.S. Cl.
CPC ..... *F02D 41/0077* (2013.01); *F02D 41/0072* (2013.01); *F02M 26/47* (2016.02); *F02M 26/53* (2016.02)

(58) Field of Classification Search
CPC ............... F02D 41/005; F02D 41/0072; F02D 41/0077; F02M 26/47; F02M 26/53
USPC ............................. 123/568.21; 701/108, 110
See application file for complete search history.

(56) References Cited

U.S. PATENT DOCUMENTS

| | | | |
|---|---|---|---|
| 6,378,515 B1 | 4/2002 | Geyer | |
| 6,467,469 B2 | 10/2002 | Yang et al. | |
| 6,868,329 B2 | 3/2005 | Ito et al. | |
| 7,006,911 B2 | 2/2006 | Wilhelm et al. | |
| 7,281,518 B1 | 10/2007 | Allain et al. | |
| 7,389,711 B2 | 6/2008 | Takabayashi et al. | |
| 7,406,959 B2 | 8/2008 | Kondo et al. | |
| 8,108,154 B2 | 1/2012 | Ramamurthy et al. | |
| 8,109,258 B2 | 2/2012 | Allain et al. | |
| 8,245,701 B2 | 8/2012 | Styles et al. | |
| 8,463,531 B2 | 6/2013 | Ramappan et al. | |
| 8,601,813 B2 | 12/2013 | Shutty et al. | |
| 2013/0085733 A1 | 4/2013 | Vartia et al. | |
| 2013/0151125 A1 | 6/2013 | Mann et al. | |
| 2014/0174412 A1 | 6/2014 | Tanaka et al. | |
| 2014/0352669 A1 | 12/2014 | Cunningham et al. | |

FOREIGN PATENT DOCUMENTS

CN 103362661 10/2013

*Primary Examiner* — Hai Huynh (57) ABSTRACT

A method of operating an Exhaust Gas Recirculation (EGR) valve of an engine is provided. The method includes monitoring an operating condition of the engine based at least on a speed of the engine and a load of the engine. The method also includes determining an amount of Carbon Monoxide (CO) in an exhaust from the engine and comparing the amount of CO with a threshold CO value. The method further includes adjusting open loop parameters of the EGR valve based on the comparison during a predetermined operating condition for the engine. The EGR valve is controlled based on the open loop parameters during switching between a closed loop control and an open loop control of the EGR valve.

20 Claims, 6 Drawing Sheets

SYSTEM AND METHOD FOR OPERATING AN EXHAUST GAS RECIRCULATION VALVE

TECHNICAL FIELD

The present disclosure relates to a system and method for operating an exhaust gas recirculation valve.

BACKGROUND

Typically, exhaust gas recirculation (EGR) valves are employed in engines for reducing various engine emissions. The EGR valve may be disposed between the engine exhaust manifold and the engine intake manifold. In order to effectively reduce the emissions, a position of the EGR valve has to be precisely controlled. In some cases, the EGR valve may be driven by an EGR actuator in a closed loop control mode. Moreover, the EGR actuator may be controlled in an engine operation range according to a predetermined strategy.

The controller may switch to an open-loop control mode when the EGR valve is approaching to a full close position based on predefined parameters that are set during an engine calibration process. However, these predefined parameters for switching modes may vary during an operation life of the engine due to an aging and/or wear of various components. Additionally, when the EGR valve switches control modes, the emissions from the engine may also be impacted.

For reference, U.S. Pat. No. 8,109,258 (hereinafter the '258 patent) discloses a method for diagnosing slow EGR response in an internal combustion engine equipped with an electronic controller with memory. In one embodiment, the method includes passing an EGR setpoint value and an actual EGR value through first order filters to eliminate high frequency noise; determining an actual EGR gradient as a function of any difference between the EGR set point and the actual EGR value while simultaneously determining an actual EGR gradient; and logging a fault in the electronic controller if the expected EGR gradient is greater than the actual EGR gradient by a predetermined amount.

However, the methods of the '258 patent may not take into account a change in the predefined parameters and the impact of the emissions thereof. The present disclosure is directed to mitigating or eliminating one or more of the drawbacks discussed above.

SUMMARY OF THE DISCLOSURE

In one aspect of the present disclosure, a method of operating an Exhaust Gas Recirculation (EGR) valve of an engine is provided. The method includes monitoring an operating condition of the engine based at least on a speed of the engine and a load of the engine. The method also includes determining an amount of Carbon Monoxide (CO) in an exhaust from the engine and comparing the amount of CO with a threshold CO value. The method further includes adjusting open loop parameters of the EGR valve based on the comparison during a predetermined operating condition for the engine. The EGR valve is controlled based on the open loop parameters during switching between a closed loop control and an open loop control of the EGR valve.

In another aspect of the present disclosure, a control system for an engine having an exhaust gas recirculation (EGR) valve is provided. The control system includes a controller operatively coupled to the EGR valve. The controller is configured to determine an amount of Carbon Monoxide (CO) in an exhaust from the engine and compare the amount of CO with a threshold CO value. The controller is also configured to adjust open loop parameters of the EGR valve based on the comparison. The controller is configured to control the EGR valve based on the open loop parameters during switching between a closed loop control and an open loop control of the EGR valve.

In yet another aspect of the present disclosure, a method of operating an Exhaust Gas Recirculation (EGR) valve of an engine is provided. The method includes monitoring an estimated EGR flow value for the EGR valve. The method also includes determining an emission level in an exhaust from the engine and adjusting open loop parameters for the EGR valve based on the emission level. The open loop parameters include a threshold EGR flow value at which a control of EGR valve is switched between a closed loop control and an open loop control, a ramp-on time and a ramp-off time for the EGR valve. The method further includes controlling the EGR valve based on at least one of the adjusted open loop parameters and the estimated flow value for the EGR valve Other features and aspects of this disclosure will be apparent from the following description and the accompanying drawings.

DETAILED DESCRIPTION

Figure 1:
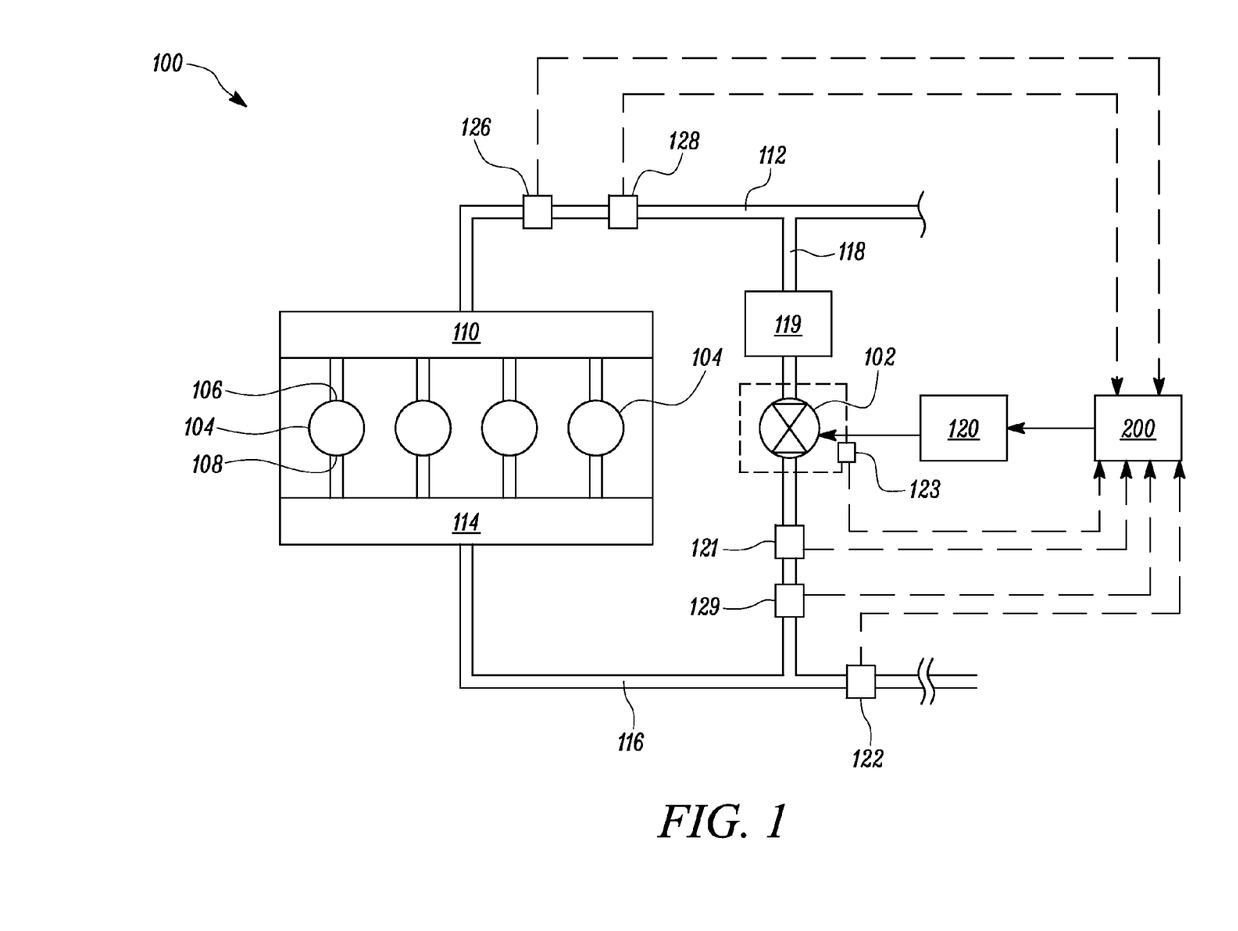
FIG. 1 is a schematic illustration of an exemplary engine having an exhaust gas recirculation (EGR) valve, according to an embodiment of the present disclosure.
Figure 2:
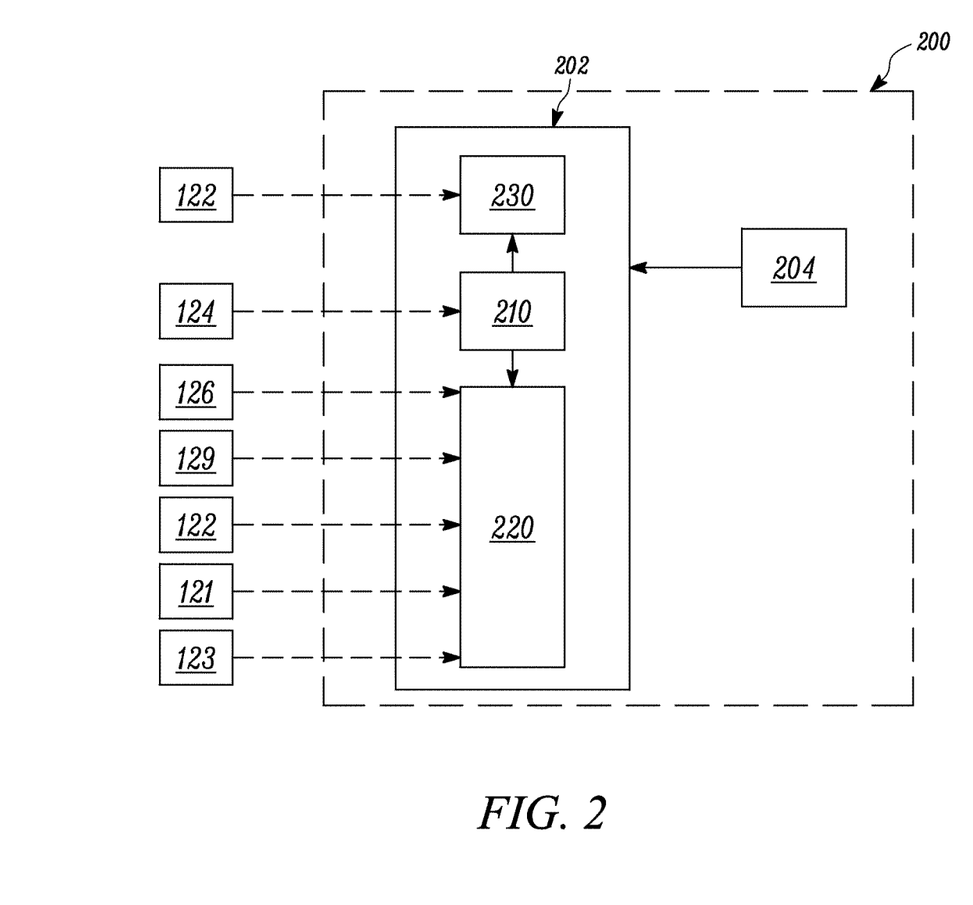
FIG. 2 is a block diagram of a control system for the engine, according to an embodiment of the present disclosure.

Wherever possible, the same reference numbers will be used throughout the drawings to refer to the same or the like parts. Referring to the drawings, FIG. 1 is a schematic illustration of an exemplary engine 100 having an exhaust gas recirculation (EGR) valve. Referring to FIG. 2, a block diagram of a control system 200 for operating the EGR valve 102 is illustrated. The engine 100 may be an internal combustion engine which runs on diesel, gasoline, gaseous fuels, or a combination thereof. The engine 100 may provide power to various types of applications and/or to machines, such as excavating machines, passenger vehicles, electric generators, mining trucks, marine vessels, agricultural machines, and the like.

The engine 100 includes one or more cylinders 104 implemented therein. Although four cylinders 104 are shown, it is recognized that the actual number of cylinders of the engine 100 may vary and that the engine 100 may be of an in-line type, a V-type, a rotary type, or other types known in the art. Each of the cylinders 104 may be configured to slidably receive a piston (not shown) therein. The engine 100 may also include one or more fuel injectors or admission valves or a combination thereof for providing fuel to the cylinders 104 that may be used for combustion in the engine.

Each of the cylinders 104 may include an intake port 106 having an intake valve (not shown) and an exhaust port 108 having an exhaust valve (not shown). Further, the intake valve and the exhaust valve may be configured for regulating the fluid communication between the cylinders 104 and, the intake port 106 and the exhaust port 108, respectively. The engine 100 may include an intake manifold 110 in fluid communication with an intake line 112 of the engine 100.

The intake port 106 receives intake air for the combustion from the intake manifold 110 to which the intake air travels after passing through, for example, an air filter (not shown) and a turbo charger (not shown) disposed in the intake line 112. As shown, an intake pressure sensor 126 and an intake temperature sensor 128 may be disposed in the intake line 112 for detecting a pressure and a temperature of the intake air in the intake line 112. In an example, the intake pressure sensor 126 and the intake temperature sensor 128 may be configured to detect an intake manifold air pressure 'Pi' and an intake manifold air temperature 'Ti' of the intake air in the intake manifold 110.

The engine 100 may also include various other sensing devices such as, an engine speed sensor 124 for determining a speed of the engine 100. The engine speed sensor 124 may be associated with a camshaft or other component of the engine 100 from which the speed of the engine may be determined. Further, a load sensor may also be operatively coupled to various components of the engine 100 such as, but not limited to, cam shaft, output shaft or other appropriate component to sense an engine load.

The engine 100 may include an exhaust manifold 114 in fluid communication with an exhaust line 116. The exhaust port 108 fluidly connects each of the cylinders 104 to the exhaust manifold 114 of the engine 100 to discharge an exhaust created by the combustion of the fuels from the cylinders 104.

Referring to FIGS. 1 and 2, the EGR valve 102 may be disposed in an Exhaust Gas Recirculation (EGR) line of the engine 100. The EGR line 118 may be fluidly coupled to at least one of the cylinders 104 or the exhaust line 116 to partly receive an amount of the exhaust. Further, the EGR line 118 may be configured to recirculate a regulated amount of the exhaust received from the cylinders 104 to the intake manifold 110. The EGR valve 102 may be regulated to control an amount of the exhaust to be passed to the intake manifold 110 via the EGR line 118. In an example, a position of the EGR valve 102 such as, a valve angle may be regulated to control an EGR flow value i.e., the amount of exhaust to be passed via the EGR line 118. Further, the EGR flow value may be determined as a function of a position of the EGR valve 102. The engine 100 may include an EGR actuator 120 communicably coupled to the EGR valve 102. The EGR actuator 120 may be configured to regulate the position of the EGR valve 102 thereby controlling the EGR flow value.

As illustrated in FIG. 1, the engine 100 may further include an EGR cooler 119 disposed in the EGR line 118. The EGR cooler 119 may be provided to reduce a temperature of the exhaust passing through the EGR line 118. The EGR line 118 may include an EGR temperature sensor 129 configured to determine a temperature 'Te' of the exhaust in the exhaust line 118. The EGR line 118 may also include a first EGR pressure sensor 121 configured to determine a pressure 'Pe' of the exhaust passing through the EGR line 118. As shown, each of the first EGR pressure sensor 121 and the EGR temperature sensor 129 may be disposed downstream of the EGR cooler 119. Further, the EGR line 118 may also include a second EGR pressure sensor 123 configured to determine a delta pressure 'Pd' i.e., a pressure differential across the EGR valve 102.

The engine 100 may also include an aftertreatment system (not shown) disposed along the exhaust line 116. The aftertreatment system may include various emission control devices such as, a diesel particulate filter (DPF), a selective catalytic reduction (SCR) catalyst, or combinations thereof.

One or more exhaust sensors 122 may be disposed in the exhaust line 116. The exhaust sensors 122 may be configured to provide signals indicative of an emission level in the exhaust. Further, the exhaust sensors 122 may provide measured emission information to the aftertreatment system to facilitate the control of the aftertreatment system. In an example, the emission level may be indicative of an amount of Carbon Monoxide (CO) 'm(CO)' in the exhaust. Additionally or optionally, the emission level may also indicate an amount of particulate matter or hydrocarbons in the exhaust. Accordingly, the exhaust sensors 122 may include a CO sensor, a particulate matter sensor or a combination thereof. The exhaust sensors 122 may also include NOx sensors configured to provide NOx information such as an amount of NOx 'm(NOx)' in the exhaust. The NOx information may enable an SCR controller associated with the SCR catalyst to adjust a dosing rate of reactant fluid such as diesel emission fluid (DEF).

It may further be contemplated to provide additional components (not shown), such as one or more inter-coolers, aftercoolers, filters and the like, in the engine 100. These components of the engine 100 are well known in the art and therefore a detailed description is not included herein.

Referring to FIG. 2, the control system 200 includes a controller 202 configured to operate the EGR valve 102. The controller 202 may embody a single microprocessor or multiple microprocessors configured for receiving signals from the various components of the control system 200 and the engine 100. Numerous commercially available microprocessors may be configured to perform the functions of the controller 202. It should be appreciated that the controller 202 may embody a machine microprocessor capable of controlling numerous machine functions. A person of ordinary skill in the art will appreciate that the controller 202 may additionally include other components and may also perform other functions not described herein. The controller 202 may also be configured to receive inputs from an operator via a user interface (not shown). In an example, the controller 202 may be an Engine Control Module (ECM) of the engine 100.

Referring to FIGS. 1 and 2, the controller 202 may be electrically connected to the EGR actuator 120 and transmits control signals to the EGR actuator 120 to operate the corresponding EGR valve 102. Further, the controller 202 may implement a control strategy to operate the EGR valve 102. Accordingly, the controller 202 may include one or more control modules configured to perform different functions. The controller 202 may also be communicably coupled to various sensing devices disposed in the engine 100 such as, the exhaust sensors 122, the intake pressure sensor 126, the intake temperature sensor 128, the speed sensor 124, the EGR temperature sensor 129, the first and second EGR pressure sensors 121, 123 and the like to receive corresponding input signals therefrom.

The control system 200 may include a memory 204 that includes information regarding one or more parameters of the engine 100. Further, the controller 202 may also be configured to refer to the data stored in the memory 204 of the control system 200. The memory 204 may also include a desired EGR flow value '(EGR)d' for the engine 100. The desired EGR flow value '(EGR)d' may be determined for the engine 100 to achieve a desired output for the engine 100 such as, a torque, the emission level and the like. For example, the desired EGR flow value '(EGR)d' may be stored as a control map or a look-up table in the memory 204 corresponding different operating parameters for the engine 100. The memory 204 may also include various reference maps or lookup tables for determining parameters related to the engine 100 such as the load of the engine 100. In an example, the load of the engine 100 may be calculated based on the speed of the engine 100, the torque and the like. Alternatively, the load of the engine 100 may be determined from a load sensor. The memory 204 may also be configured to store various data determined by the controller 202.

In an embodiment, the memory 204 may be integral to the controller 202. The memory 204 may be a read only memory (ROM) for storing a program or programs, a random access memory (RAM) which serves as a working memory area for use in executing the program(s) stored in the memory 204 or a combination thereof. Alternatively, the memory 204 may be external to the controller 202 and/or the control system 200.

The controller 202 and the associated control elements of FIG. 2 may be used to implement the control strategy for the EGR valve 102. As may be seen from the schematic illustration of FIGS. 2 and 3, the controller 202 may be programmed with various control modules such as, a first control module 210, a second control module 220, and a third control module 230, for example, implementing the logic of the control strategy. Though illustrated as being contained within a single controller, the first, second and third control modules 210, 220, 230 may be distributed across multiple processing elements of the control system 200 if necessary based on the requirements of a particular implementation. However, for the purpose of illustration, the controller 202 will be discussed herein as a single processing element.

The first control module 210 may be configured to monitor an operating condition of the engine 100. The first control module 210 may also be configured to determine if the engine 100 is operating in one of a first operating condition or a second operating condition. Further, the first control module 210 may determine the first operating condition and the second operating condition of the engine 100 based at least on the speed of the engine 100 and the load of the engine 100. Accordingly, the first control module 210 may be communicably coupled to the speed sensor 124 and the load sensor to receive a signal indicative of the speed of the engine 100 and the load of the engine 100. Alternatively, at least one of the speed and the load of the engine 100 may be calculated based on other parameters by referring to look-up tables, reference maps, mathematical relations and the like stored in the memory 204. In an example, the load of the engine 100 may be determined based on the speed of the engine 100 and a fuel quantity injected into the cylinders 104.

Further, the first control module 210 may be configured to determine one or more measurement windows for each of the first operating condition and the second operating condition of the engine 100. The first control module 210 may detect the measurement window for each of the first operating condition and the second operating condition of the engine 100 based on a set of calibration parameters corresponding to engine performance characteristics which will be described in detail herein. The set of calibration parameters may include an injection timing, an injection pressure, an injection mode, a fuel quantity, an emission level or others depending on a type of application.

In an embodiment, the first operating condition may be a steady state operating condition for the engine 100. Accordingly, the first operating condition may correspond to an operating condition of the engine 100 at which the parameters related to the engine 100 such as, an injection timing, an injection pressure and the like may remain substantially constant over a period of time. In such a case, the first control module 210 may further be configured to monitor the specific set of calibration parameters during the first operating condition. The first control module 210 may also refer to engine calibrations maps or reference tables to obtain predetermined calibration points corresponding to the calibration parameters. These calibration maps or reference tables may be set during the engine calibration process and stored in the ECM of the engine 100. The first control module 210 may be configured to determine an occurrence of the measurement window, when the measured calibration parameters are substantially close to the corresponding predetermined calibration points for example, +/−3% within the set value.

In one embodiment, the first control module 210 may determine a full load or a part load operating condition corresponding to a predetermined speed, a fuel quantity and other calibration parameters as the measurement window for the first operating condition. For example, when the engine 100 runs at 1800 rpm, the controller 200 also monitors the calibration parameters such as, the fuel quantity, the injection mode, the injection pressure, a desired EGR ratio, and the injection timing When these calibration parameters are substantially close to corresponding predetermined calibration points that are utilized during engine calibration process, the first control module 210 may determine that the measurement window for the first operating condition may occur.

In an embodiment, the second operating condition may be a transient operation condition for the engine 100. Moreover, the first control module 210 may also determine the measurement window for the second operating condition. For example, the first control module 210 may determine an acceleration operating condition between a predefined speed range along an engine lug curve as the measurement window for the second operating condition. The speed range may be defined such that a control mode for the EGR valve 102 may switch between a close loop control and an open loop control which will be explained in detail later herein. The measurement window for the second operating condition may correspond to an operating condition of the engine 100 at which there may be a possibility of occurrence of spike of the emission level in the exhaust. In an example, the emission level may be the amount of CO 'm(CO)' in the exhaust from the engine 100. In another example, the emission level may be an amount of particulate matter in the exhaust.

Accordingly, the first control module 210 may refer to calibration maps, look-up tables or other suitable data stored in the memory 204 to determine the first operating condition and the second operating condition. However, it may also be contemplated to implement other alternate methods to determine the first operating condition, the second operating condition and the associated measurement windows.

In an embodiment, the first control module 210 may also determine if the engine 100 is in an idling condition. In an example, the first control module 210 may determine the idling condition for the engine 100, if a net output power of the engine 100 is below a threshold (e.g. 2 KW) and the speed of the engine 100 is below another threshold value (e.g. 800 rpm). Additionally, the first control module 210 may also determine if the engine 100 is in a cold start mode if a coolant temperature falls below a threshold coolant temperature such as a temperature at which the EGR valve 102 may be deactivated. The first control module 210 may further determine if the engine 100 is in a service mode. In an example, the first control module 210 may determine that the engine 100 is in the service mode, if a DPF regeneration mode or a SCR desulphation mode is active. In various other examples, other conditions associated with the servicing of the aftertreatment system may also be determined as the service mode.

Further, the first control module 210 may determine if the engine 100 is in an altitude mode. In an example, the first control module 210 may determine the altitude mode based on a pressure of the ambient air. Moreover, an ambient condition such as, an altitude at which emission standards prescribed for the engine 100 are not applicable may be determined as the altitude mode.

The first control module 210 may be communicably coupled to the second control module 220 and the third control module 230 to implement one or more logics of the control strategy. The control strategy implemented by the control system 200 will be explained in detail hereinafter with reference to FIGS. 3 to 6. The control strategy may begin at an adder 232 of the controller 202. The adder 232 is configured to receive the desired EGR flow value '(EGR)d' and an estimated EGR flow value '(EGR)est' for the EGR valve 102.

Figure 3:
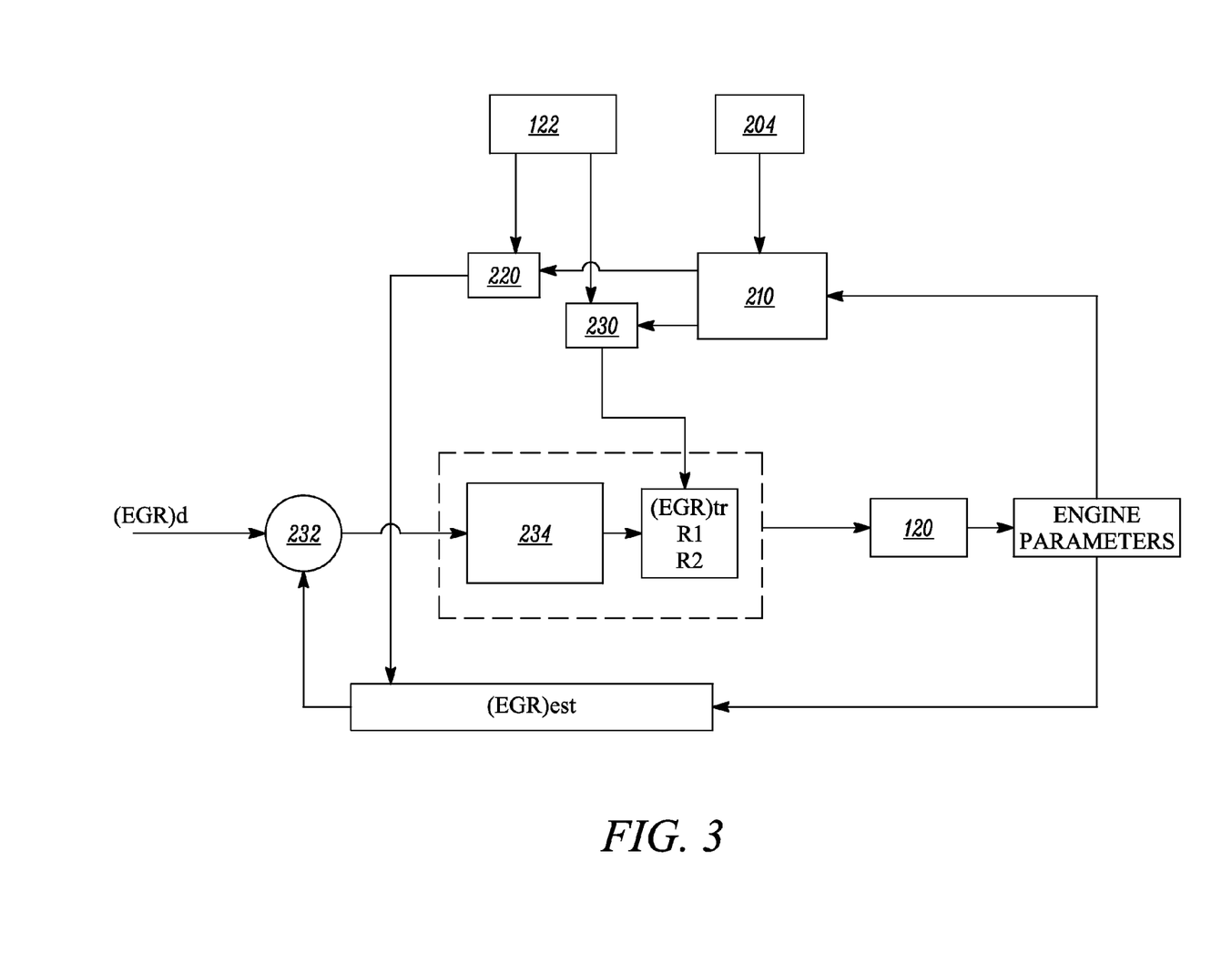
FIG. 3 is a block diagram for a control strategy implemented by the control system for operating the EGR valve, according to an embodiment of the present disclosure.

The second control module 220 may be configured to determine the estimated EGR flow value '(EGR)est'. In an embodiment, the second control module 220 may determine the estimated EGR flow value '(EGR)est' based on a non-linear relationship with pressure values and temperature values of the intake air and predefined coefficients associated therewith.

In an example, the estimated EGR flow value '(EGR)est' may be derived from the following equation (1):

$$(EGR)est = a1 + a2*P0 + a3*P1 + a4*P2 + a5*T + a6*(P0)^2 + a7*(P1)^2 + (a8*(P2)^2) + a9*T^2 + a10*P0*P1 + a11*P0*P2 + a12*P0*T1*(a13*P1*P2) + a14*P1*T + a15*P2*T \quad (1)$$

Where;
a1, a2, . . . , a15 are the predefined coefficients,
P0, P1, P2 are the pressure values,
T is the temperature value.

The pressure values may include an absolute pressure of the intake air, a gauge pressure of the intake air and the like. These pressure values may be determined for the intake air in the intake manifold 110, or other locations in the intake line 112 such as, an outlet of a compressor of the turbocharger and the like. Additionally, the pressure values may also include the absolute pressure and/or the gauge pressure of the exhaust determined at various locations in the EGR line 118 or the aftertreatment system. According to an aspect of the disclosure, the pressure values may include the intake manifold air pressure 'Pi', the exhaust pressure 'Pe' before the EGR valve 102 in the EGR line 118 and the differential pressure 'Pd' across the EGR valve 102. Accordingly, the second control module 220 may be communicably coupled to the intake pressure sensor 126, the first EGR pressure sensor 121 and the second EGR pressure sensor 123 to receive signals indicative of the corresponding pressure values.

Similarly, the temperature values may include a temperature of the intake air determined in the intake manifold 110, the outlet of the compressor and the like. For example, the second control module 220 may be communicably coupled to the intake temperature sensor 128 to receive signals indicative of the intake manifold air temperature 'Ti'. Alternatively, the temperature values may correspond to temperatures of the exhaust determined at various locations in the EGR line 118 or the aftertreatment system. In an example, the temperature value is the temperature 'Te' of the exhaust in the EGR line 118 after the EGR cooler 119. Accordingly, the second control module 220 may be communicably coupled to the EGR temperature sensor 129 to receive signal indicative of the temperature 'Te' of the exhaust.

In an embodiment, the second control module 220 is also configured to implement a first adjustment strategy for determining an accuracy of the estimated EGR flow value '(EGR)est'. Further, the second control module 220 may implement the first adjustment strategy at predefined time intervals. The predefined time intervals may correspond to a predefined operating time of the engine 100 such as, 500 hours of engine operating time. Moreover, at these predefined time intervals, the second control module 220 may implement the first adjustment strategy when the measurement window for first operating condition of the engine 100 occurs. In an example, the first operating condition may be the steady state operating condition for the engine 100. Accordingly, the second control module 220 may be communicably coupled to the first control module 210 to receive an input indicating an occurrence of the measurement window for the first operating condition. As discussed above, the first control module 210 may determine an occurrence of the measurement window, when the measured calibration parameters are substantially close to the predetermined calibration points during engine steady state operating condition.

Figure 4:
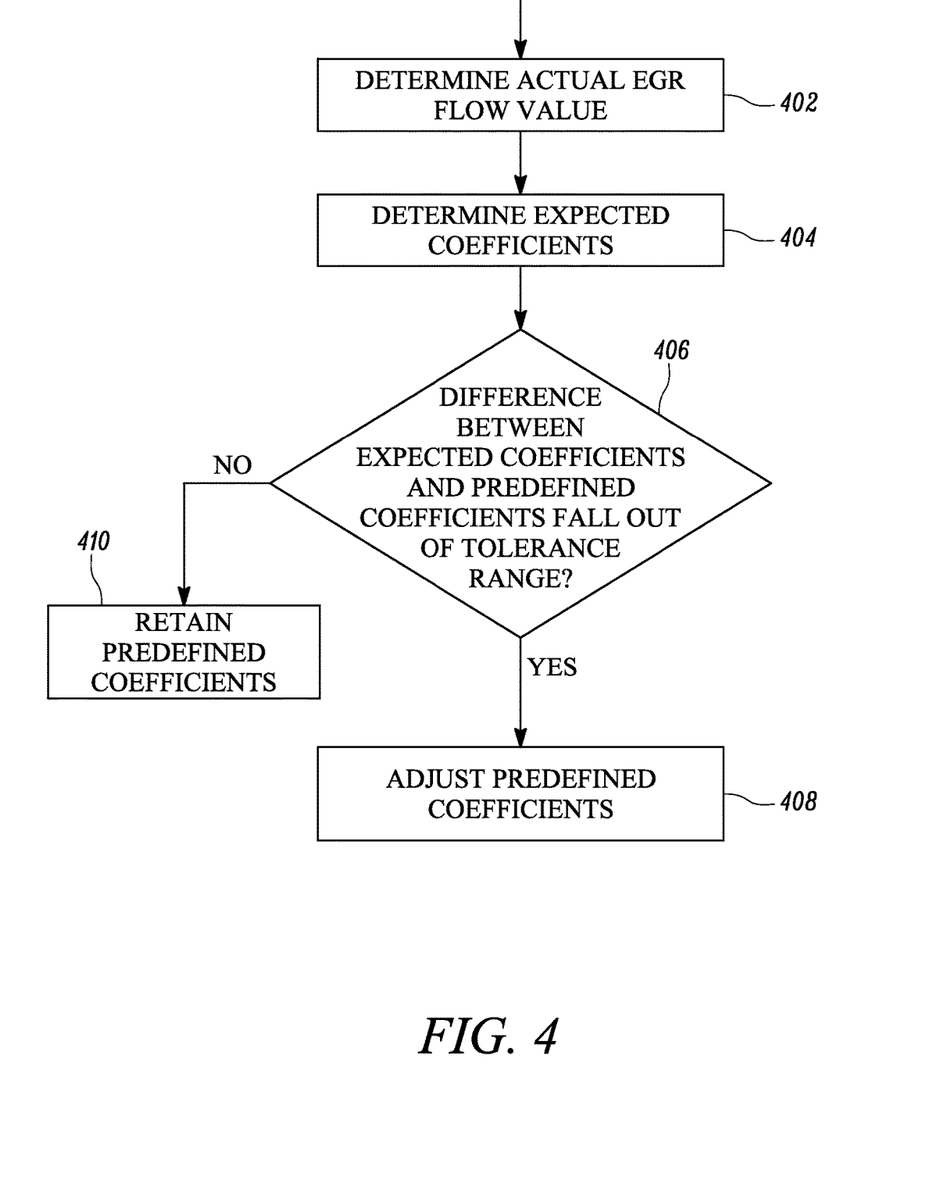
FIG. 4 is a flowchart for a first adjustment strategy implemented by a controller of the control system, according to an embodiment of the present disclosure.

Referring to FIG. 4, an exemplary algorithm for implementing the first adjustment strategy is illustrated. At step 402, the second control module 220 determines an actual EGR flow value '(EGR)act' based at least on the amount of NOx 'm(NOx)' in the exhaust during the measurement window for the first operating condition. In one example, the second control module 220 may receive an input indicative of the amount of NOx 'm(NOx)' from the exhaust sensors 122. Alternatively, the second control module 220 may implement virtual models commonly known in the art to predict the amount of NOx 'm(NOx)' based on other parameters of the engine 100. In an example, the second control module 220 may determine the amount of NOx 'm(NOx)' based on a humidity value of the intake air.

At step 402, the second control module 220 may receive parameters related to the engine 100 to determine the actual EGR flow value '(EGR)act'. The parameters may include the ignition timing, the injection pressure, the intake manifold air temperature 'Ti' and others. Subsequently, the second control module 220 may refer to maps, look-up tables, stored algorithms, virtual models, mathematical relations or other known methods to determine the actual EGR flow value '(EGR)act'. Further, the second control module 220 may determine the actual EGR flow values '(EGR)act' at various discrete measurement windows during the first operating conditions.

At step 404, the second control module 220 may determine expected coefficients that are utilized in equation (1) to determine the estimated EGR flow '(EGR)est' based on a multivariate regression methodology. In an embodiment, the second control module 220 may solve for the expected coefficients using the following equation (2) by least square method or other methods known in the art;

$$\begin{bmatrix} 1 & C_{1,2} & C_{1,3} & \cdots & C_{1,15} \\ 1 & C_{2,2} & C_{2,3} & \cdots & C_{2,15} \\ 1 & C_{3,2} & C_{3,3} & \cdots & C_{3,15} \\ \vdots & & & & \\ 1 & C_{k,2} & C_{k,3} & \cdots & C_{k,15} \end{bmatrix} \times \begin{bmatrix} b1 \\ b2 \\ \vdots \\ b15 \end{bmatrix} = \begin{bmatrix} Y_1 \\ Y_2 \\ Y_3 \\ \vdots \\ Y_k \end{bmatrix} \quad (2)$$

Where;

C is an element in the sensor input matrix that is associated with the predefined coefficients as indicated in equation (1) for calculating the estimated EGR flow values '(EGR)est', b1, . . . . b15 are elements in the expected coefficients vector that are to be determined by solving the equation (2), and Y is an element in the actual EGR flow value '(EGR)act' vector that is derived based on the amount of NOx 'm(NOx)' determined at multiple discrete measurement windows during the first operating condition.

Alternatively, the second control module 220 may implement a physical model or an algorithm to determine the expected coefficients. In an example, the physical model may receive as an input, the pressure values, the temperature values and other variables that are used to determine the actual EGR flow value '(EGR)act'. Further, the physical model may output the expected coefficients based on the received inputs.

At step 406, the second control module 220 may determine if a difference between the expected coefficients and the predefined coefficients fall out of a tolerance range. The second control module 220 may pass the control from step 406 to step 408 if the difference falls out of the tolerance range. At step 408, the second control module 220 may adjust the predefined coefficients. In an embodiment, the second control module 220 may replace the predefined coefficients with the expected coefficients, if the difference falls out of the tolerance range. At step 408, the second control module 220 may also determine the estimated EGR flow value '(EGR)est' for the EGR based on the adjusted predefined coefficients.

However, if at step 406, the second control module 220 determines that the difference is within the tolerance range, the control may be passed to step 410. At step 410, the second control module 220 may retain the predefined coefficients. Further, the controller 202 may use the predefined coefficients determined from step 408 or 410 for subsequent calculations for the estimated EGR flow value '(EGR)est'.

Referring back to FIG. 3, the adder 232 of the controller 202 may receive the estimated EGR flow value '(EGR)est' from the second control module 220. The adder 232 may perform a comparison of the desired EGR flow value '(EGR)d' to the estimated EGR flow value '(EGR)est'. Further, the adder 232 may determine a flow error based on a difference between the desired EGR flow value '(EGR)d' and the estimated EGR flow value '(EGR)est'. As such, the controller 202 may operate the EGR valve 102 in the closed loop control based on the desired EGR flow value '(EGR)d' and a feedback such as, the estimated EGR flow value '(EGR)est'. Further, the controller 202 may operate the EGR valve 102 to minimize the difference between the desired EGR flow value '(EGR)d' and the estimated EGR flow value '(EGR)est'.

In an embodiment, the controller 202 may include a proportional-integral (PI) controller 234. The calculated flow error may be transmitted from the adder 232 to the proportional-integral (PI) controller 234 of the controller 202. The PI controller 234 may be configured to use the desired EGR flow value '(EGR)d' and the flow error to determine a control signal for the EGR actuator 120 to cause the estimated EGR flow value '(EGR)est' to increase or decrease toward the desired EGR flow value '(EGR)d' at a response rate specified during the configuration of the PI controller 234. The specific programming of the PI controller 234 to calculate the control signal is within the understanding of those skilled in the art, and a detailed discussion of the PI controller programming methods is not provided herein. It should be noted also that the use of the PI controller 234 is exemplary, and other types of controllers and control calculations capable of determining the control signal may be implemented in the control strategy in accordance with the present disclosure.

The controller 202 may transmit the control signals determined by the PI controller 234 to the EGR actuator 120. The EGR actuator 120 may accordingly control the position of the EGR valve 102 to control the EGR flow value through the EGR line 118 to the intake manifold 110.

The controller 202 may also be configured to switch between an open loop control and the closed loop control. Further, the controller 202 may operate the EGR valve 102 based on open loop parameters during switching between the closed loop control and the open loop control. The open loop parameters may include a threshold EGR flow value '(EGR)th' at which the switching occurs, a ramp-off time 'R1' and a ramp-on time 'R2'. The ramp-off time 'R1' may be defined as a rate at which the EGR valve 102 moves from a position of the EGR valve 102 corresponding to the threshold EGR flow value '(EGR)th' towards the full closed position. The ramp-on time 'R2' may be defined as a rate at which the EGR valve 102 moves from the full closed position to a position of the EGR valve 102 corresponding to the threshold EGR flow value '(EGR)th'.

In an embodiment, the controller 202 may switch from the closed loop control to the open loop control during an EGR valve closing event, i.e., when the EGR valve 102 approaches the full closed position. The controller 202 may determine an occurrence of the EGR valve closing event, when the desired EGR flow value '(EGR)d' is less than the threshold EGR flow value '(EGR)th'. In such a case, the controller 202 may operate the EGR valve 102 in the closed loop control until the estimated EGR flow value '(EGR)est' reaches the threshold EGR flow value '(EGR)th' during the EGR valve closing event. Further, the controller 202 may switch to the open loop control of the EGR valve 102 upon the estimated EGR flow value '(EGR)est' reaching the threshold EGR flow value '(EGR)th'. Further, the controller 202may ramp the EGR valve 102 from a position corresponding to the threshold flow value '(EGR)th' to the full closed position at the ramp-off time 'R1'.

In another embodiment, the controller 202 may operate the EGR valve 102 in the open loop control during an EGR valve opening event, i.e., when the EGR valve 102 approaches a position or angle of the EGR valve 102 corresponding to the threshold EGR flow value '(EGR)th' from the full closed position. In such a case, during the EGR valve opening event, the controller 202 may operate the EGR valve 102 in the open loop control until the estimated EGR flow value '(EGR)est' reaches the threshold EGR flow value '(EGR)th'. Accordingly, the controller 202 may ramp the EGR valve 102 at the ramp-on time 'R2' to the position of the EGR valve 102 corresponding to the threshold EGR flow value '(EGR)th'. Further, the controller 202 may switch to the closed loop control of the EGR valve 102 upon reaching the position corresponding to the threshold EGR flow value '(EGR)th'. Thereafter, the controller 202 may operate based on the control signal indicative of different control gains determined by the PI controller 234 based on the desired EGR flow value '(EGR)d' and the flow error.

In an embodiment, at least one of the open loop parameters for the EGR valve opening event and the EGR valve closing event may be different from each other. In an example, the threshold EGR flow value '(EGR)th' at which the controller 202 switches between the closed loop control and the open loop control may be different for the EGR valve opening event and the EGR valve closing event. This difference may work as hysteresis to avoid unexpected disturbance or the oscillation between close loop control and open loop control modes. Alternatively, the open loop parameters may be same for both the EGR valve opening event and the EGR valve closing event.

Referring still to FIG. 3, the controller 202 may compare the estimated EGR flow value '(EGR)est' received from the second control module 220 to the threshold EGR flow value '(EGR)th'. The controller 202 may be configured to receive the threshold EGR flow value '(EGR)th' and other open loop parameters from the third control module 230.

In an embodiment, the third control module 230 may refer to the memory 204 to determine the open loop parameters. Moreover, the open loop parameters may be predefined for a particular configuration of the engine 100 and stored in the memory 204. The third control module 230 is configured to adjust these open loop parameters. The third control module 230 may adjust the open loop parameters at least based on the emission level in the exhaust such as, the amount of CO 'm(CO)' in the exhaust and the amount of particulate matter in the exhaust.

In an embodiment, the third control module 230 is configured to implement a second adjustment strategy to adjust the open loop parameters. Moreover, the third control module 230 may implement the second adjustment strategy at predefined time intervals. The predefined time intervals may correspond to a predefined operating time of the engine 100 such as, 500 hours of engine operating time. Moreover, at these predefined time intervals, the third control module 230 may implement the second adjustment strategy when the measurement window for the second operating condition of the engine 100 occurs. In an example, as described above, the second operating condition may be the transient operating condition for the engine 100.

Accordingly, the third control module 230 may be communicably coupled to the first control module 210 to receive an input indicating an occurrence of the measurement window for the second operating condition. In an example, as described above, the first control module 210 may determine an acceleration operating condition between the predefined speed range along the engine lug curve as the measurement window for the second operating condition. The speed range may be defined such that the control mode for the EGR valve 102 switches between the close loop control and the open loop control.(e.g., from 1000 rpm to 1400 rpm).

Figure 5:
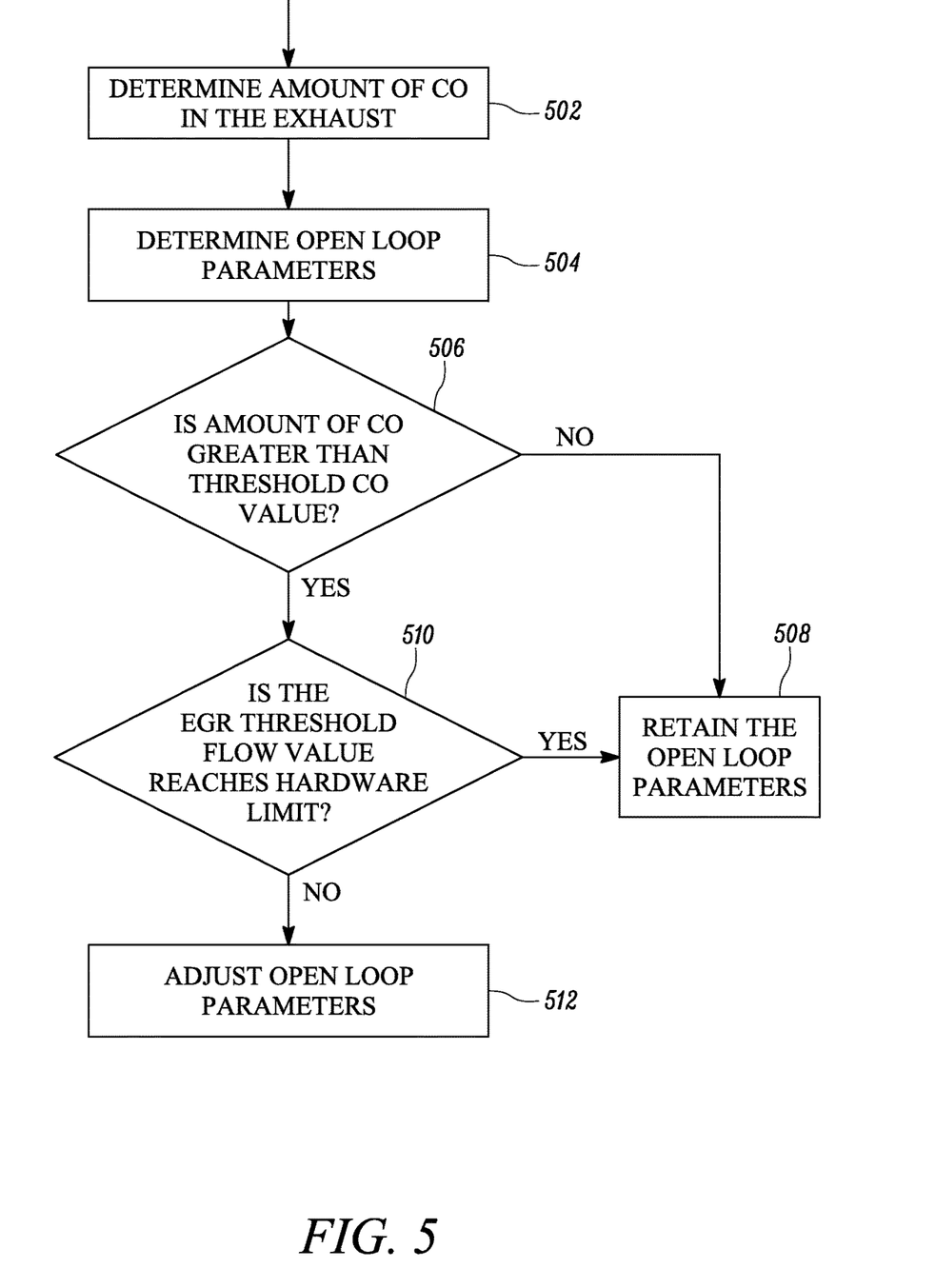
FIG. 5 is a flowchart for a second adjustment strategy implemented by the controller, according to an embodiment of the present disclosure.

Referring to FIG. 5, a flowchart for the second adjustment strategy to adjust the open loop parameters is illustrated. At step 502, the third control module 230 may determine the amount of CO 'm(CO)' in the exhaust. In an example, the amount of CO 'm(CO)' may be expressed as parts per million CO in the exhaust. In one embodiment, the third control module 230 may receive, via the exhaust sensor 122, an input indicative of the amount of CO 'm(CO)'. Alternatively, the third control module 230 may calculate the amount of CO 'm(CO)' in the exhaust based on a virtual model, a predetermined relationship or other known algorithms.

At step 502, the third control module 230 may also receive other parameters related to the engine 100 such as, the injection timing, the injection pressure, the intake manifold air temperature 'Ti' and the like. Consequently, the third control module 230 may be communicably coupled to various sensors disposed in the engine 100.

At step 504, the third control module 230 may determine if the switching between the closed loop control to the open loop control occurs. The third control module 230 may further determine if the switching occurs due to the EGR valve opening event or the EGR valve closing event. Moreover, the third control module 230 may also determine the open loop control parameters based on which the controller 202 may operate the EGR valve 102 during switching between the closed loop control and the open loop control. The third control module 230 may refer to calibration maps, look up tables or other relevant data stored in the memory 204 to determine the open loop parameters as described above.

The third control module 230 may pass the control to step 506 upon determining any occurrence of the switching conditions as described above such as, the EGR valve opening event or the EGR valve closing event. At step 506, the third control module 230 may determine if the amount of CO 'm(CO)' is greater than a threshold CO value. The third control module 230 may pass the control from step 506 to 508 if the amount of CO 'm(CO)' is less than the threshold CO value. At step 508, the third control module 230 may retain the determined open loop control parameters for the EGR valve 102.

However, if at step 506, the third control module 230 determines that the amount of CO 'm(CO)' is greater than the threshold CO value, the control may be passed from step 506 to step 510. At step 510, the third control module 230 may further determine if the determined threshold EGR flow value '(EGR)th' substantially reaches a hardware limit for the EGR valve 102. The hardware limit may be an EGR flow value corresponding to a position of the EGR valve 102 beyond which the EGR valve 102 may not be consistently controlled or may not be opened or closed. In an example, the hardware limit may be the EGR flow value corresponding to a valve angle substantially equal to a valve angle for the full closed position of the EGR valve 102. In such a case, the third control module 230 may determine if the threshold EGR flow value '(EGR)th' is greater than or equal to the hardware limit.

The third control module 230 may pass the control from step 510 to step 508, if the threshold EGR flow value '(EGR)th' reaches the hardware limit. However, if at step 510, the third control module 230 determines that the threshold EGR flow value '(EGR)th' does not reach the hardware limit (e.g., the threshold EGR flow value '(EGR)th' is greater than the hardware limit for the EGR valve closed position), the control may be passed from step 510 to step 512.

At step 512, the third control module 230 may adjust the open loop parameters for the EGR valve 102. If at step 504, it is determined that the switching is during the EGR valve opening event, the third control module 230 may decrease the threshold EGR flow value '(EGR)th' within the hardware limit. Moreover, the third control module 230 may decrease the threshold EGR flow value '(EGR)th' in predetermined discrete levels. Additionally, the third control module 230 may also adjust other open loop parameters based on a relationship between each of the open loop control parameters. In an example, the third control module 230 may increase the ramp-on time 'R2' based on a relationship between the threshold EGR flow value '(EGR)th' and the ramp-on time 'R2'.

Further, if at step 504, it is determined that the switching is during the EGR valve closing event, the third control module 230 may adjust the ramp-off time 'R1'. The third control module 230 may refer to calibrated maps or look up tables stored in the memory 204 to obtain the relationships between each of the open loop parameters.

Those skilled in the art will understand that the configuration of the control system 200 shown in FIG. 2 and described herein is exemplary only, and other configurations are contemplated for implementation of the control strategy in accordance with the present disclosure.

Figure 6:
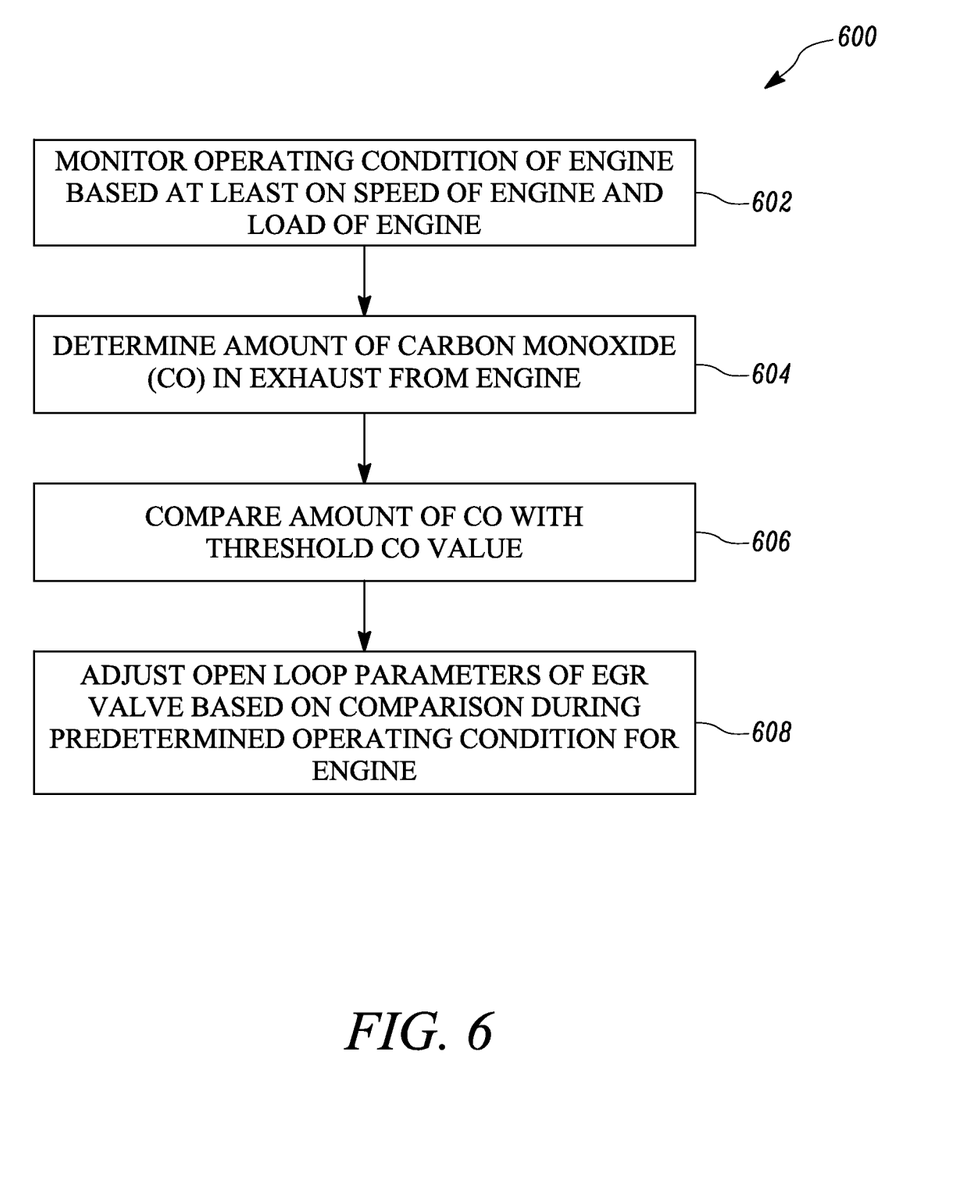
FIG. 6 is a flowchart for a method of operating the EGR valve of the engine, according to an embodiment of the present disclosure.

Referring to FIG. 6, a flowchart for a method 600 of operating an EGR valve of an engine, in accordance with an embodiment of the present disclosure is illustrated. The method 600 will be explained in conjunction with the EGR valve 102 of the engine 100 illustrated in FIG. 1. However, a person of ordinary skill in the art will understand that the method 600 may be implemented in other configurations of the engine and the EGR valve. In an embodiment, one or more steps of the method 600 may be implemented by the control system 200. The method 600 will be explained hereinafter as implemented by the control system 200.

At step 602, the method 600 includes monitoring an operating condition of the engine 100 based at least on the speed of the engine 100 and the load of the engine 100. Specifically, at step 602, the method 600 includes determining if the engine 100 is operating in any of the first operating condition and the second operating condition. Additionally, the method 600 may also include determining if the engine 100 is operating in the idling condition, the cold start mode, the service mode or the altitude mode.

In an embodiment, the first control module 210 of the controller 202 may be configured to monitor the operating condition of the engine 100. The first control module 210 may also be configured to determine the measurement window for a predetermined operating condition i.e., the second operating condition of the engine 100. Moreover, the controller 202 may be configured to implement steps 604, 606 and 608 during the measurement window for the second operating condition when the operating condition of the engine 100 is not corresponding to the idling condition, cold start mode, the service mode or the altitude mode.

At step 604, the method 600 includes determining the amount of CO 'm(CO)' in the exhaust from the engine 100. At step 606, the method 600 includes comparing the amount of CO 'm(CO)' with the threshold CO value. At step 608, the method 600 includes adjusting the open loop parameters of the EGR valve 102 based on the comparison during a predetermined operating condition for the engine 100. The EGR valve 102 may be controlled based on the open loop parameters during switching from the closed loop control to the open loop control of the EGR valve 102. The open loop parameters may include the threshold EGR flow value '(EGR)th' at which the switching occurs, the ramp-on time 'R2', the ramp-off time 'R1' and the like. In an embodiment, the third control module 230 may be configured to adjust the open loop parameters as explained with reference to FIG. 5.

According to another embodiment of the present disclosure, the open loop parameters may be adjusted based on the emission level, such as the amount of CO 'm(CO)' or the amount of particulate matter such as, soot level in the exhaust.

Further, the method 600 includes adjusting the predefined coefficients for the estimated EGR flow value '(EGR)est' during the measurement window for the first operating condition for the engine 100 when the operating condition of the engine 100 is not corresponding to the idling condition, the service mode or the altitude mode.

Accordingly, to adjust the predefined coefficients for the estimated EGR flow value '(EGR)est', the method 600 includes determining the actual EGR flow value '(EGR)act' based at least on the amount of NOx 'm(NOx)'. In an embodiment, the second control module 220 is configured to implement the first adjustment strategy to adjust the predefined coefficients as described with reference to FIG. 4. Accordingly, the second control module 220 is configured to monitor the estimated EGR flow value '(EGR)est' for the EGR valve 102. In an example, the estimated EGR flow value '(EGR)est' may be determined based on a non-linear relationship with the pressure values and the temperature values for the intake air and the predefined coefficients associated therewith.

The method 600 further includes determining the expected coefficients based on the actual EGR flow value '(EGR)act' and the estimated EGR flow value '(EGR)est'. The second control module 220 may further adjust the predefined coefficients if the difference between the expected coefficients and the predefined coefficients falls out of the tolerance range as explained above with reference to FIG. 4.

In an embodiment, the adjusting the predefined coefficients and adjusting the open loop parameters may be performed at predetermined time intervals. In an example, the predetermined time interval may correspond to 500 hours of operating time of the engine 100. The predefined time intervals may be set by an operator and stored in the memory 204.

INDUSTRIAL APPLICABILITY

Typically, open loop parameters are used to define when and how a control of an EGR valve switches between close loop mode and open loop control. These parameters are usually predefined during an engine calibration process and fixed for the engine operation life. However, these parameters may change during an operating life of the engine due to wear of the EGR valve or other components. Such a change may also impact the emission levels in the exhaust from the engine during the switching. Many other factors may result in the nonlinearity of EGR valve control, such as a manufacturing tolerance and wearing of parts. Moreover, the nonlinearity of EGR valve may also impact the determination of the EGR threshold flow value '(EGR)th'.

The present disclosure relates to the control system 200 and the method 600 for operating the EGR valve 102. The controller 202 is configured to self-adjust the open loop parameters such as the threshold EGR flow value '(EGR)th', the ramp-on time 'R2' and the ramp-off time 'R1'. Further, the controller 202 takes into considerations, the emission level such as the amount of CO 'm(CO)' to adjust these open loop parameters. In an example, when there is a CO spike followed by the EGR valve opening event, the controller 202 may decrease the threshold EGR flow value '(EGR)th'.

Further, the controller 202 may adjust the ramp-off time 'R1' during the EGR valve close event.

Additionally, the controller 202 is configured to determine the estimated EGR flow value '(EGR)est' based on the non-linear relationship with the pressure values and the temperature values. Further, the controller 202 may also check the accuracy of the estimated EGR flow value '(EGR)est' and also adjust the predefined coefficients based on the emission level specifically, the amount of NOx 'm(NOx)'. As described above with reference to FIG. 4, the controller 202 may implement the first adjustment strategy to determine an accuracy of the estimated EGR flow value '(EGR)est'.

Moreover, as the exhaust sensors 122 such as the NOx sensors are widely implemented in the aftertreatment systems of various engines, the control strategies explained herein such as the first adjustment strategy may be easily configured in the existing engines. As such, the EGR valve 102 may be operated based on the estimated EGR flow value '(EGR)est' determined based on the adjusted coefficients and also the adjusted open-loop parameters.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of operating an Exhaust Gas Recirculation (EGR) valve of an engine, the method comprising:
    monitoring an operating condition of the engine based at least on a speed of the engine and a load of the engine;
    determining an amount of Carbon Monoxide (CO) in an exhaust from the engine;
    comparing the amount of CO with a threshold CO value; and
    adjusting open loop parameters of the EGR valve based on the comparison during a predetermined operating condition for the engine, wherein the EGR valve is controlled based on the open loop parameters during switching between a closed loop control and an open loop control of the EGR valve.

2. The method of claim 1, wherein the open loop parameters includes a threshold EGR flow value at which the switching occurs, a ramp-on time and a ramp-off time for the EGR valve.

3. The method of claim 2 further comprising increasing the threshold EGR flow value in discrete levels if the amount of CO exceeds the threshold CO value.

4. The method of claim 2 further comprising monitoring an estimated EGR flow value for the EGR valve.

5. The method of claim 4 further comprising switching between the closed loop control and the open loop control of the EGR valve when the estimated EGR flow value is approximately equal to the threshold EGR flow value.

6. The method of claim 4, wherein the estimated EGR flow value is determined based on a non-linear relationship with at least pressure values and temperature values for intake air and predefined coefficients associated therewith.

7. The method of claim 6 further comprising:
    determining an actual EGR flow value for the EGR valve based at least on an amount of NOx in the exhaust; and
    determining expected coefficients for the pressure values and the temperature values for the intake air based on the actual EGR flow value and the estimated EGR flow value; and
    adjusting the predefined coefficients if a difference between the expected coefficients and the predefined coefficients fall out of a tolerance range.

8. The method of claim 6 further comprising:
    determining a steady state operating condition of the engine by monitoring the operating condition of the engine; and
    detecting a measurement window for each of the steady state operating condition and the predetermined operating condition based on calibration parameters for the engine, wherein the open loop parameters are adjusted during the measurement window for the predetermined operating condition of the engine, and wherein the predefined coefficients are adjusted during the measurement window for the steady state operating condition of the engine.

9. A control system for an engine having an exhaust gas recirculation (EGR) valve, the control system comprising:
    a controller operatively coupled to the EGR valve, the controller configured to:
        determine an amount of Carbon Monoxide (CO) in an exhaust from the engine;
        compare the amount of CO with a threshold CO value; and
        adjust open loop parameters of the EGR valve based on the comparison, wherein the controller is configured to control the EGR valve based on the open loop parameters during switching between a closed loop control and an open loop control of the EGR valve.

10. The control system of claim 9, wherein the open loop parameters includes a threshold EGR flow value at which the switching occurs, a ramp-on time and a ramp-off time for the EGR valve.

11. The control system of claim 10 further comprising increasing the threshold EGR flow value in discrete levels if the amount of CO exceeds the threshold CO value.

12. The control system of claim 10 further comprising monitoring an estimated EGR flow value for the EGR valve, wherein the estimated EGR flow value is determined based on a non-linear relationship with at least pressure values and temperature values for intake air, and predefined coefficients associated therewith.

13. The control system of claim 12 further comprising:
    determining an actual EGR flow value for the EGR valve based at least on an amount of NOx in the exhaust; and
    determining expected coefficients for the pressure values and the temperature values for the intake air based on the actual EGR flow value and the estimated EGR flow value; and
    adjusting the predefined coefficients if a difference between the expected coefficients and the predefined coefficients fall out of a tolerance range.

14. The control system of claim 13 further comprising:
    monitoring an operating condition of the engine to determine a first operating condition and a second operating condition of the engine based at least on a speed of the engine and a load of the engine;
    detecting a measurement window for each of the first operating condition and the second operating condition based on calibration parameters for the engine;

adjusting the predefined coefficients associated with the pressure values and the temperature values during the measurement window for the first operating condition of the engine; and adjusting the open loop parameters during the measurement window for the second operating condition of the engine.

15. The control system of claim 12 further comprising switching between the closed loop control and the open loop control of the EGR valve when the estimated EGR flow value is approximately equal to the threshold EGR flow value.

16. A method of operating an Exhaust Gas Recirculation (EGR) valve of an engine, the method comprising:
monitoring an estimated EGR flow value for the EGR valve;
determining an emission level in an exhaust from the engine;
adjusting open loop parameters for the EGR valve based on the emission level, wherein the open loop parameters include a threshold EGR flow value at which a control of the EGR valve is switched between a closed loop control and an open loop control, a ramp-on time and a ramp-off time for the EGR valve; and
controlling the EGR valve based on at least one of the adjusted open loop parameters and the estimated flow value for the EGR valve.

17. The method of claim 16, wherein the estimated EGR flow value is determined based on a non-linear relationship with at least pressure values and temperature values for intake air and predefined coefficients associated therewith.

18. The method of claim 17 further comprising:
determining an actual EGR flow value for the EGR valve based at least on an amount of NOx in the exhaust; and
determining expected coefficients for the pressure values and the temperature values for the intake air based on the actual EGR flow value and the estimated EGR flow value; and
adjusting the predefined coefficients if a difference between the expected coefficients and the predefined coefficients fall out of a tolerance range.

19. The method of claim 16, wherein the emission level is indicative of an amount of Carbon Monoxide (CO) in the exhaust.

20. The method of claim 16 further comprising:
monitoring an operating condition of the engine to determine a transient operating condition of the engine based at least on a speed of the engine and a load of the engine;
detecting a measurement window for the transient operating condition based on calibration parameters for the engine, wherein the open loop parameters are adjusted during the measurement window for the transient operating condition of the engine.

* * * * *